(12) United States Patent
Hunt et al.

(10) Patent No.: US 11,676,791 B2
(45) Date of Patent: Jun. 13, 2023

(54) X-RAY TUBE LIQUID METAL BEARING STRUCTURE FOR REDUCING TRAPPED GASES

(71) Applicant: GE Precision Healthcare LLC, Wauwatosa, WI (US)

(72) Inventors: Ian Strider Hunt, Sussex, WI (US); Andrew Thomas Cross, Waterford, NY (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 91 days.

(21) Appl. No.: 17/181,303

(22) Filed: Feb. 22, 2021

(65) Prior Publication Data

US 2022/0270843 A1    Aug. 25, 2022

(51) Int. Cl.
*H01J 35/02* (2006.01)
*F16C 17/10* (2006.01)
*F16C 33/10* (2006.01)

(52) U.S. Cl.
CPC ............ *H01J 35/02* (2013.01); *F16C 17/102* (2013.01); *F16C 33/1065* (2013.01)

(58) Field of Classification Search
CPC .. H01J 35/104; H01J 35/02; H01J 2235/1086; H01J 2235/20; H01J 35/10;
(Continued)

(56) References Cited

U.S. PATENT DOCUMENTS 5,384,819 A * 1/1995 Ono ...................... F16C 33/107
378/132
5,483,570 A * 1/1996 Renshaw ............. A61B 6/4488
378/132
(Continued)

FOREIGN PATENT DOCUMENTS

JP        06176720 A    6/1994
JP     2005172223 A    6/2005
(Continued)

OTHER PUBLICATIONS

Papadodopoulos et al., CFD Thermohydrodynamic Analysis of 3-D Sector-Pad Thrust Bearings with Rectangular Dimples, Proceedings of ASME Turbo Expo 2013: Turbine Technical Conference and Exposition, Jun. 3-7, 2013, San Antonio, Texas, 11 pages.
(Continued)

*Primary Examiner* — Irakli Kiknadze

(57) ABSTRACT

A bearing structure for an X-ray tube is provided that includes a journal bearing shaft with a radially protruding thrust bearing encased within a bearing sleeve, one of which rotates relative to the other. The stationary component, e.g., the journal bearing and/or the thrust bearing includes at least one vent groove formed therein that improves the ability of the journal bearing structure to enable gases trapped by the liquid metal within the bearing assembly to escape through the vent groove to the exterior of the X-ray tube. By adding a strategically located channel or vent groove of sufficient size in at least one of the journal bearing or the thrust bearing, the pressures resisted by the seal created between the liquid metal and the vent groove(s) in the bearing components is significantly reduced, allowing escape of the gases to avoid detrimental effects to the operation of the X-ray tube, while maintaining the load carrying capacity of the bearing assembly.

20 Claims, 6 Drawing Sheets

(58) Field of Classification Search
CPC ............... H01J 35/06; H01J 2235/1208; H01J 2235/1046; H01J 2235/106; H01J 35/066; H01J 35/16; H01J 35/1017; H01J 35/1024; H01J 35/107; H01J 35/103; H01J 35/101; H01J 2235/1266; H01J 2235/1026; H01J 2235/085; H01J 2235/1073; H01J 35/106; H01J 35/08; H01J 2235/1093; H01J 2235/1204; H01J 2235/1262; H01J 2235/1283; H01J 2235/127; H01J 2235/1066; H01J 2235/16; H01J 2235/108; H01J 2235/12; H01J 2235/08; G01N 23/04; F16C 2226/36; F16C 32/064; F16C 37/002; F16C 33/6692; F16C 2380/16; F16C 17/10; F16C 2210/08; A61B 6/035; A61B 6/4476; A61B 6/547; A61B 6/4014; A61B 6/482; A61B 6/032; H02P 23/20; H05G 1/66; H05G 1/52; H05G 1/46; G01T 1/16; G01T 7/00

USPC ................. 378/119, 162, 132, 133, 143, 144
See application file for complete search history.

(56) References Cited

U.S. PATENT DOCUMENTS

| | | | | |
|---|---|---|---|---|
| 6,546,078 | B2* | 4/2003 | Ide | H01J 35/104 378/144 |
| 10,094,425 | B2* | 10/2018 | Bachmaan | G01N 23/04 |
| 10,438,767 | B2* | 10/2019 | Hunt | F16C 17/04 |
| 2007/0009095 | A1* | 1/2007 | Turaga | F16C 17/26 378/132 |
| 2014/0247922 | A1* | 9/2014 | Ueki | F16C 17/026 378/133 |
| 2016/0133431 | A1 | 5/2016 | Hunt et al. | |
| 2017/0102031 | A1* | 4/2017 | Potze | F16C 33/24 |
| 2022/0049740 | A1* | 2/2022 | Blome | F16C 33/1065 |

FOREIGN PATENT DOCUMENTS

| | | |
|---|---|---|
| JP | 2020024799 | 2/2020 |
| WO | 2016077049 | 5/2016 |

OTHER PUBLICATIONS

JP application 2022-016909 filed Feb. 7, 2022—Office Action dated Jan. 18, 2023, Machine Translation Jan. 19, 2023; 4 pages.
JP2005172223—English Abstract, Espacenet, Mar. 28, 2023; 1 page.
JPH06176720—English Abstract, Espacenet, Mar. 28, 2023; 1 page.

* cited by examiner

X-RAY TUBE LIQUID METAL BEARING STRUCTURE FOR REDUCING TRAPPED GASES

BACKGROUND OF THE INVENTION

The invention relates generally to X-ray tubes, and more particularly to structures and methods of assembly for the bearing utilized in an X-ray tube.

X-ray systems, including computed tomography (CT) imaging systems, may include an X-ray tube, a detector, and a support structure for the X-ray tube and the detector, operation, an imaging table, on which an object is positioned, may be located between the X-ray tube and the detector. The X-ray tube typically emits radiation, such as X-rays, toward the object. The radiation passes through the object on the imaging table and impinges on the detector. As radiation passes through the object, internal structures of the object cause spatial variances in the radiation received at the detector. The detector then generates data, and the system translates the data into an image, which may be used to evaluate the internal structures of the object. The object may include, but is not limited to, a patient in a medical imaging procedure and an inanimate object as in, for instance, a package in an X-ray scanner or CT scanner.

X-ray tubes include a cathode and an anode located within a high-vacuum environment. In many configurations, the anode structure is supported by a liquid metal bearing structure, e.g., a herringbone groove or spiral groove bearing (SGB) structure, also known as a hydrodynamic bearing, formed with a shaft disposed within a sleeve to which the anode target is attached and rotates around the shaft. The spiral groove bearing structure also includes grooves, such as spiral or helical grooves, on various surfaces of the shaft and or the sleeve that serve to take up the radial and axial forces acting on the sleeve as it rotates around the shaft.

Typically, an induction motor is employed to rotate the anode, the induction motor having a cylindrical rotor built into an axle formed at least partially of the sleeve that supports the anode target and a stator with copper windings that surrounds an elongated neck of the X-ray tube. The rotor of the rotating anode assembly is driven by the stator. The X-ray tube cathode provides a focused electron beam that is accelerated across a cathode-to-anode vacuum gap and produces X-rays upon impact with the anode target. Because of the high temperatures generated when the electron beam strikes the target, it is necessary to rotate the anode assembly at a high rotational speed. This places stringent demands on the bearings and the material forming the anode structure, i.e., the anode target and the shaft supporting the target.

Advantages of liquid metal bearings such as spiral groove bearings in X-ray tubes include a high load capability and a high heat transfer capability due to an increased amount of contact area. Other advantages include low acoustic noise operation, as is commonly understood in the art. Gallium, indium, or tin alloys, among others, are typically used as the liquid metal in the bearing structure, as they tend to be liquid at room temperature and have adequately low vapor pressure at operating temperatures, to meet the rigorous high vacuum requirements of an X-ray tube.

However, during the manufacturing process for the bearings, small amounts of gas(es) can become trapped within the bearing structure. As the interior of the X-ray tube is constructed to create a high vacuum environment therein for the optimal operation of the X-ray tube for generation of X-rays, the presence of even small amounts of gas(es) within the X-ray tube is highly undesirable. While the liquid metals utilized in the construction of the bearings can allow this gas to escape through the volume of the liquid metal between the bearing components, certain aspects of the construction of the liquid metal bearings do not readily allow this to occur. For example, due to the high surface tension of the liquid metal utilized in the bearings, the adherence of the liquid metal to the bearing surfaces creates a high-pressure seal, i.e., up to 20 psi, between the liquid metal and the bearing components that often exceeds the pressure of the gas(es) trapped within the bearing, thereby retaining the gas within the bearing. Further, the construction of the components of the bearing structure, e.g., the grooves, can include textured areas operable to retain the liquid metal in the proper locations for functioning as a bearing fluid, further enhancing the seal and preventing the gas from escaping through the liquid metal. These seals formed by the liquid metal and the bearing structure(s) and their ability to retain gases within the journal bearing structure is further increased by various wetting surfaces and non-wetting coatings that are applied to areas of the surfaces of the journal bearing components to assist in retaining the liquid metal where desired to facilitate the rotation of the journal bearing components relative to one another.

As a result, while the structure of the journal bearing components and the liquid metal disposed between the components operates to effectively enable the sleeve to rotate with respect to the shaft, the bearing retains significant amounts of trapped gas(es) disposed within the bearing structure, detrimentally of the operation of the X-ray tube including the journal bearing, including, but not limited to failure of the X-ray tube.

Therefore, it is desirable to develop a structure and method for the formation and operation of a liquid metal bearing structure for an X-ray tube to significantly improve the transfer or escape of gas(es) trapped in the assembled bearing out of the liquid metal bearing structure to minimize the detrimental effects of the gas(es) on the operation of the X-ray tube.

BRIEF DESCRIPTION OF THE DISCLOSURE

In the present disclosure a liquid metal or spiral groove bearing structure for an X-ray tube and associated process for manufacturing a bearing structure comprised of a shaft having a journal bearing and a radially protruding thrust bearing encased within a bearing housing or sleeve. The sleeve includes a thrust seal that is engaged with the sleeve around the thrust bearing in a manner to maintain coaxiality for the rotating liquid metal seal formed within the sleeve about the journal bearing shaft. The engagement of the thrust seal with the sleeve around the thrust bearing on the journal bearing shall enables the liquid metal to be retained between the journal bearing shaft and the sleeve to enable free rotation of the sleeve around the journal bearing shaft during operation of the X-ray tube.

The structure of one or both of the journal bearing and the thrust bearing includes at least one vent groove formed therein that improves the ability of the journal bearing structure to enable gases trapped by the liquid metal within the bearing assembly to escape through the vent groove to the exterior of the X-ray tube. By adding a strategically located channel or vent groove of sufficient size in at least one of the journal bearings or the thrust bearings, the pressures resisted by the seal created between the liquid metal and the vent groove(s) in the bearing components is significantly reduced, while maintaining the load carrying capacity of the bearing assembly. As a result, the pressure level of the gases contained by capillary wetting of the journal bearing shaft and the thrust bearing by the liquid metal can exceed the pressure of the seal in the vent groove, thereby allowing the gas to escape the tube along the vent groove without detrimentally affecting the bearing performance.

In one exemplary embodiment of the invention, bearing assembly for an X-ray tube including a shaft, a sleeve disposed around the shaft, wherein one of the shaft and the sleeve is rotatable with regard to the other to form a rotating component and a stationary component, a lubricating fluid disposed between the shaft and the sleeve within a gap between the sleeve and the shaft; and at least one vent groove disposed on the stationary component.

In another exemplary embodiment of the invention, an X-ray tube includes a cathode assembly, and an anode assembly spaced from the cathode assembly, wherein the anode assembly includes a shaft, a sleeve disposed on the shaft, wherein one of the shaft and the sleeve is rotatable with regard to the other to form a rotating component and a stationary component, a lubricating fluid disposed between the shaft and the sleeve within a gap between the sleeve and the shaft, and at least one vent groove disposed on the stationary component, and an anode target operably connected to the sleeve.

In still another exemplary embodiment of the method of the invention, a method for enabling gases trapped in a bearing assembly to be vented from bearing assembly during use in an operating X-ray tube including the steps of providing a bearing assembly having a shaft, a sleeve disposed on the shaft, wherein one of the shaft and the sleeve is rotatable with regard to the other to form a rotating component and a stationary component, a lubricating fluid disposed between the shaft and the sleeve within a gap between the sleeve and the shaft, and at least one vent groove disposed on the stationary component, and operating the X-ray tube to rotate the rotating component relative to the stationary component.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
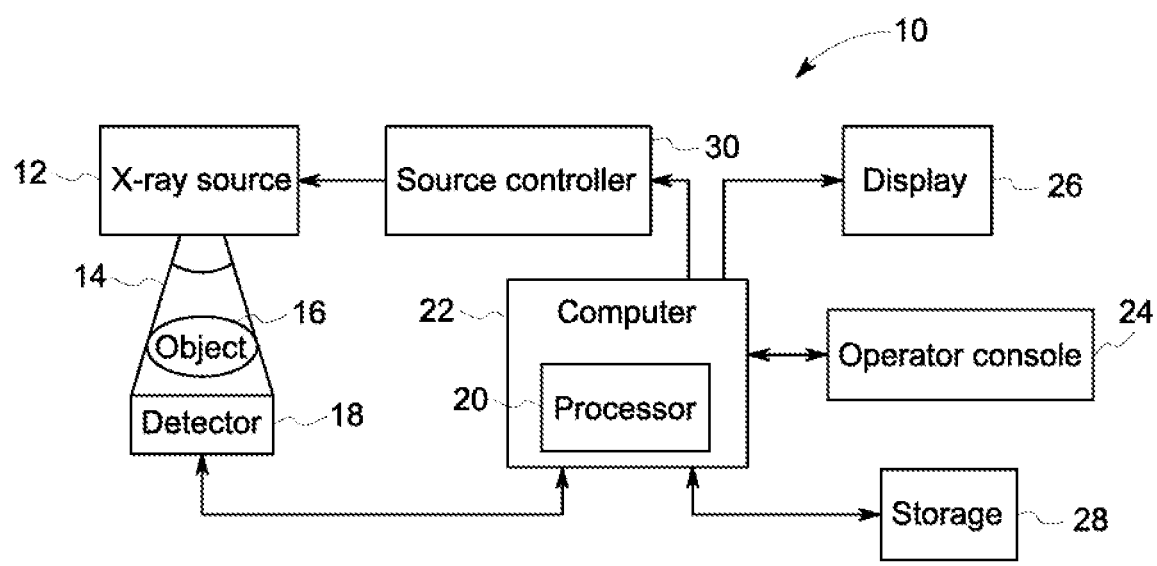
FIG. 1 is a block diagram imaging system incorporating exemplary embodiments of the disclosure.

FIG. 1 is a block diagram of an embodiment of an imaging system 10 designed both to acquire original image data and to process the image data for display and/or analysis in accordance with embodiments of the invention. It will be appreciated by those skilled in the art that various embodiments of the invention are applicable to numerous medical imaging systems implementing an X-ray tube, such as X-ray imaging systems or fluoroscopic imaging systems. Other imaging systems such as computed tomography (CT) imaging systems and digital radiography (RAD) imaging systems, which acquire image three-dimensional data for a volume, also benefit from the invention. The following discussion of X-ray imaging system 10 is merely an example of one such implementation and is not intended to be limiting in terms of modality.

As shown in FIG. 1, imaging system 10 includes an X-ray tube or X-ray source 12 configured to project a beam of X-rays 14 through an object 16. Object 16 may include a human subject, pieces of baggage, or other objects desired to be scanned. X-ray source 12 may be conventional X-ray tubes producing X-rays 14 having a spectrum of energies that range, typically, from thirty (30) keV to two hundred (200) key. The X-rays 14 pass through object 16 and, after being attenuated, impinge upon a detector assembly 18. Each detector module in detector assembly 18 produces electrical signals that represents the intensity of an impinging X-ray beam, and hence the attenuated beam, as it passes through the object 16. In one embodiment, detector assembly 18 is a scintillator based detector assembly, however, it is also envisioned that direct-conversion type detectors (e.g., CZT detectors, photon-counting detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the X-ray system 10 and view the reconstructed image or other data from computer 22 on a display unit 26. Additionally, console 24 allows an operator to store the generated image in a storage device 28 which may include hard drives, floppy discs, compact discs, etc. The operator may also use console 24 to provide commands and instructions to computer 22 for controlling an X-ray source controller 30 that provides power and timing signals to X-ray source 12.

Figure 2:
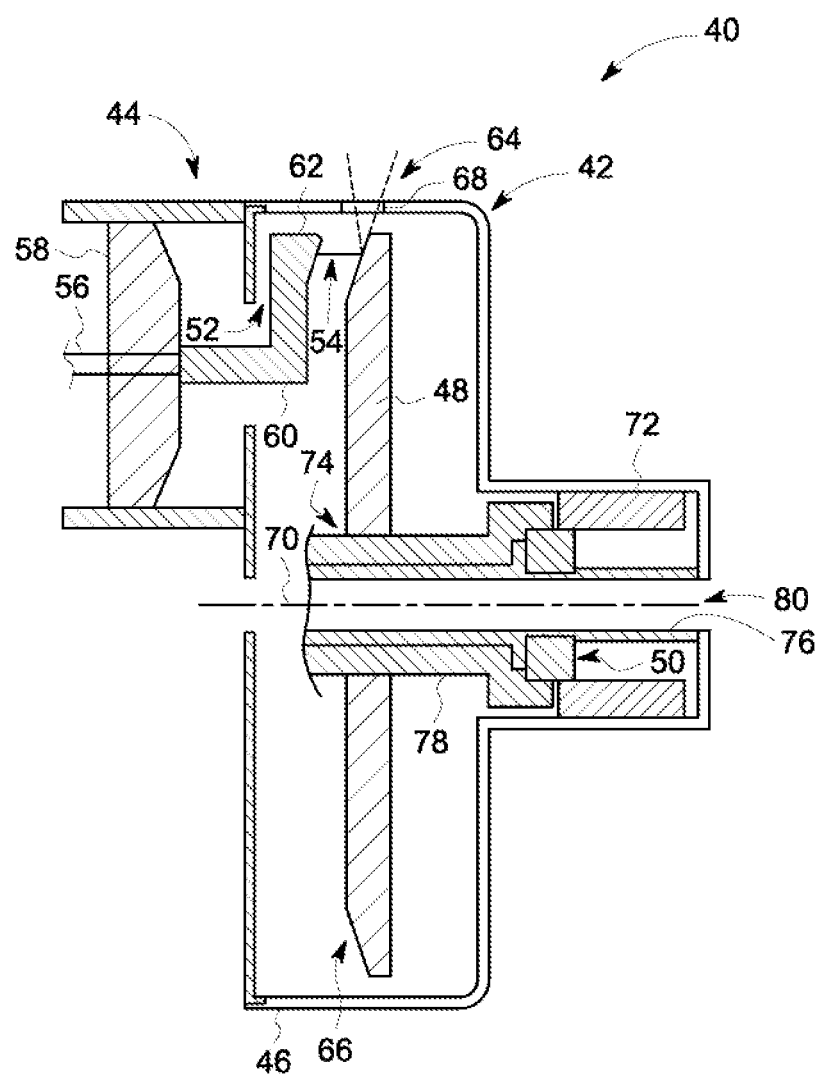
FIG. 2 is a cross-sectional view of a portion of an X-ray tube according to an exemplary embodiment of the disclosure and usable with the system illustrated in FIG. 1.

FIG. 2 illustrates a cross-sectional view of an X-ray source 12 incorporating embodiments of the invention. In the illustrated embodiment, X-ray source 12 is an X-ray tube 40 that includes an anode assembly 42 and a cathode assembly 44. The anode and cathode assemblies 42, 44 are supported within an insert or frame 46, which houses a target or anode 48, a bearing assembly 50, and a cathode 52. Frame 46 defines an area of relatively low pressure (e.g., a vacuum) compared to ambient, in which high voltages may be present. Frame 46 may be positioned within a casing (not shown) filled with a cooling medium, such as oil, that may also provide high voltage insulation. While the target and anode are described above as being a common component of X-ray tube 40, the target and anode may be separate components in alternative X-ray tube embodiments.

In operation, an electron beam 54 is produced by cathode assembly 44. In particular, cathode 52 receives one or more electrical signals via a plurality of electrical leads 56. The electrical signals may include power and timing/control signals that cause cathode 52 to emit electron beam 54 at one or more energies and at one or more frequencies. The electrical signals may also at least partially control the potential between cathode 52 and anode 48. Cathode 52 includes an insulator 58 from which an arm 60 extends. Arm 60 encloses electrical leads 56, which extend into a cathode cup 62 mounted at the end of arm 60. In some embodiments, cathode cup 62 includes focusing elements that focuses electrons emitted from a filament within cathode cup 62 to form electron beam 54.

X-rays 64 are produced when high-speed electrons of electron beam 54 from cathode 52 are suddenly decelerated upon impacting a target surface 66 formed on anode target 48. The high-speed electrons forming electron beam 54 are accelerated toward the anode target 48 via a potential difference therebetween of, for example, sixty (60) thousand volts or more in the case of CT applications. The X-rays 64 are emitted through a radiation emission window 68 formed in frame 46 that is positioned toward a detector array, such as detector 18 of FIG. 1.

Anode assembly 42 includes a rotor 72 and a stator (not shown) located outside X-ray source 40 and partially surrounding rotor 72 for causing rotation of anode target 48 during operation. Anode target 48 is supported in rotation by a bearing assembly 50, which, when rotated, also causes anode target 48 to rotate about a centerline 70. As shown, anode target 48 has a generally annular shape, such as a disk, and an annular opening 74 in the center thereof for receiving bearing assembly 50.

Target 48 may be manufactured to include a number of metals or composites, such as tungsten, molybdenum, or any material that contributes to Bremsstrahlung 4 i.e., deceleration radiation) when bombarded with electrons. Target surface 66 of anode target 48 may be selected to have a relatively high refractory value so as to withstand the heat generated by electrons impacting target surface 66. Further, the space within insert or frame 46 and between cathode assembly 44 and anode assembly 42 is at vacuum pressure in order to minimize electron collisions with other atoms and to maximize an electric potential.

To avoid overheating of the target 48 when bombarded by the electrons, rotor 72 rotates target 48 at a high rate of speed (e.g., 90 to 250 Hz) about a centerline 70. In addition to the rotation of anode target 48 within X-ray tube frame 46, in a CT application, the X-ray source 40 as a whole is caused to rotate within a gantry (not shown) about an object, such as object 16 of X-ray imaging system 10 in FIG. 1, at rates of typically 1 Hz or faster.

Bearing assembly 50 can be formed as necessary, such with a number of suitable ball bearings (not shown), but in the illustrated exemplary embodiment comprises a liquid lubricated or self-acting bearing, such as a liquid metal bearing, having adequate load-bearing capability and acceptable acoustic noise levels for operation within imaging system 10 of FIG. 1. As used herein, the terms "self-acting" and "self-lubricating" mean that the bearing lubricating fluid remains distributed on the surfaces of the bearing due to the relative motion of the bearing components and absent an external pump.

In general, bearing assembly 50 includes a stationary component, such as shaft 76, and a rotating component, such as sleeve 78 that surrounds the shaft 76 and to which the anode target 48 is attached. While shaft 76 is described with respect to FIG. 2 as the stationary portion of bearing assembly 50 and sleeve 78 is described as the rotating portion of bearing assembly 50, embodiments of the present invention are also applicable to embodiments wherein the shaft 76, the rotating component, rotates within a stationary sleeve 78, a stationary component. In such a configuration, anode target 48 would rotate as shaft 76 rotates.

Shaft 76 includes a cavity, bore or coolant flow path 80 though which a coolant 82 (FIG. 3), such as oil, flows to cool bearing assembly 50. As such, coolant 82 enables heat generated from anode target 48 of X-ray source 40 (FIG. 2) to be extracted therefrom and transferred external to X-ray source 40. In straddle mounted bearing assembly configurations, coolant flow path 80 extends along a longitudinal length of shaft 76. In alternative embodiments, bore 80 may extend through only a portion of shaft 76, such as in configurations where an X-ray source 40 is cantilevered when an X-ray imaging system.

Figure 3:
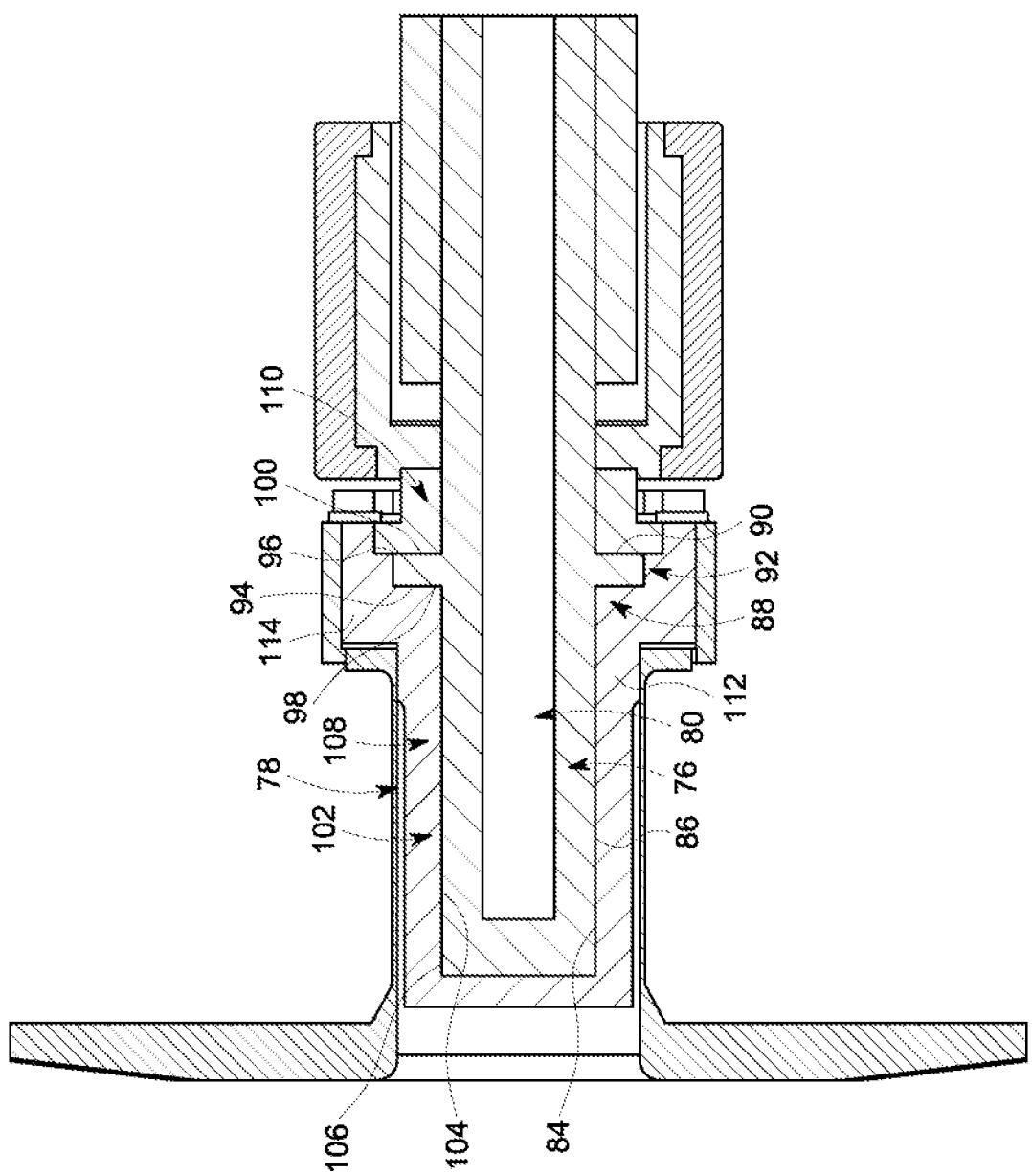
FIG. 3 is a cross-sectional side plan view of a bearing structure of an ray tube in accordance with an exemplary embodiment of the disclosure.

Referring now to FIG. 3, a cross-sectional view of a portion of bearing assembly or structure 50 is shown according to an embodiment of the invention. Bearing assembly 50 includes a shaft 76 positioned within sleeve 78, which is configured to support an anode target, such as anode target 48 of FIG. 2. A lubricating fluid 84 is positioned in a gap 86 formed between shaft 76 and sleeve 78. In embodiments of the invention, lubricating fluid 84 is a metal or metallic alloy that exists in a liquid state at operating temperature of bearing assembly 50.

The lubricating fluid 84 flowing between the rotating and stationary components of the bearing assembly 50 may include a variety of individual fluids as well as mixtures of fluids. For example, multiple liquid metals and liquid metal alloys may be used as the lubricating fluid, such as an indium gallium alloy. More generally, fluids with relatively low vapor pressures that are resistant to evaporation in vacuum-level pressures of the X-ray tube may be used. In the present context, low vapor pressures may generally be in the range of $1\times10^{-5}$ Torr. In other words, fluids that are stable in vacuums are desirable for use in X-ray tube systems so as to not adversely affect the established vacuum during operation of the system. In the present disclosure, lubricating fluid 84 may be gallium or a gallium alloy as non-limiting examples.

In the embodiment illustrated in FIG. 3, shaft 76 of bearing assembly 50 is a stationary component and sleeve 78 is a rotatable component constructed to rotate about shaft 76. However, one skilled in the art will recognize the inventive concepts described herein are applicable to alternative bearing configurations. As one example, bearing assembly 50 may instead include a stationary outer component or shell and a rotating shaft comprising an anode target attached thereto. As another example, bearing assembly 50 may be a "straddle" bearing that is configured to support an anode target between a first and a second liquid metal bearing. In other words, embodiments of this invention may be incorporated into any bearing configuration utilizing a liquid metal bearing to support an anode target. Such configurations may include a stationary shaft and a rotatable outer sleeve, and vice versa. Further, one skilled in the art will recognize that such applications need not be limited to X-ray tubes, but may be applied to any structural configuration having a rotating component and a stationary component in a vacuum, the rotating component being supported within a liquid metal bearing assembly. Thus, the embodiments of the invention disclosed herein are applicable to any bearing configuration having a rotatable component and a stationary component, and a lubricating fluid therebetween, regardless of configuration or application.

As illustrated in FIG. 3, shaft 76 of bearing assembly 50 includes a thrust bearing 88 comprising a radial projection 90 that extends from shaft 76 and is positioned in a radial cavity 92 of sleeve 78. Radial projection 90 of thrust bearing 88 includes a pair of outer bearing surfaces 94, 96 that face inner bearing surfaces 98, 100 of radial cavity 92 of sleeve 78. Radial projection 90 limits axial motion of sleeve 78 relative to shaft 76, and, as illustrated, lubricating fluid 84 is also included between radial projection 90 and sleeve 78. Radial projection 90 need not be limited in axial length, but may be extended in axial length to provide additional mechanical support of components.

The shaft 76 also includes a journal bearing 102 located adjacent to and extending axially from thrust bearing 88. An outer surface 104 of journal bearing 102 of shaft 76 faces an inner surface 106 of sleeve 78. While journal bearing 102 is illustrated on a first side of thrust bearing 88 adjacent outer bearing surface 94, one skilled in the art will recognize that bearing assembly 50 may include a second journal bearing portion located on a second side of thrust bearing 88 adjacent outer bearing surface 96. Various coatings, textures, and patterns including grooves embedded in the contacting/bearing surfaces of bearing assembly 50 may be applied to alter bearing behavior as the shaft 76 and sleeve 78 rotate relative to each other.

In the exemplary embodiment illustrated in FIG. 3 the sleeve 78 may be formed with a 2-piece construction including a sleeve portion 108 and a thrust seal 110. The sleeve portion 108 is formed of a material that is low cost, with good machinability, good galling/wear characteristics, and good weldability. Further, while these materials do conduct heat, optionally a thermal barrier can be included between the bearing assembly 50 and the anode target 48 to maintain the temperatures in the bearing assembly 50 below the corrosion limits of the materials forming the bearing assembly 50. In an exemplary embodiment of the invention, the material forming the sleeve portion 108 may be a non-refractory metal, such as an iron alloy, including stainless steel, tool carbon steel, such as D2 steel, among others, though refractory materials and metals, such as molybdenum, can also be utilized. The sleeve portion 108 may be formed as a single piece of the selected material, with a closed cylindrical cap portion 112 at one end and an open seating portion 114 at the opposite end. In the illustrated exemplary embodiment, the seating portion 114 may be optionally integrally formed with the cap portion 112 to form a unitary structure for the sleeve portion 108 within which the shaft 76 and thrust seal 110 may be engaged, such as that disclosed in U.S. Patent Application Publication No. US2016/0133431, entitled Welded Spiral Groove Bearing Assembly, the entirety of which is expressly incorporated herein by reference. In an alternative exemplary embodiment of the bearing assembly 50, the sleeve 78 may be formed with a spacer (not shown) disposed between the sleeve portion 108 and the thrust seal 110, where the spacer is formed of a suitable material, such as a metal including steel, that includes grooves (not shown) and/or suitable anti-wetting, coatings (not shown) applied to the surfaces of the spacer disposed immediately adjacent and in contact with the sleeve portion 108 and the thrust seal 110 to form seals therebetween.

Bearing assembly 50 may be referred to as a spiral groove bearing (SGB) due to the patterning of bearing grooves 200 (FIG. 4) along the various surfaces of the bearing assembly 50. The grooves 200 may be formed in the bearing surfaces, such as on the exterior of the journal bearing 102, the interior surface of the sleeve portion 108, and on one or both outer bearing surfaces 94, 96 and inner bearing surfaces 98, 100 and can be separated by un-grooved areas 118. In some examples, the grooves 200 may be formed from a chevron or a logarithmic spiral shape. The spiral groove bearing may also be equivalently referred to as a fluid dynamic or hydrodynamic bearing and liquid metal bearing as well. In such spiral groove bearings, ways to contain the lubricating fluids 84 may be categorized in two general methods. The first includes providing physical barriers near the ends of the bearing where shaft seals would be placed in other applications. Rubber or other types of shaft seals in the presence of the vacuum inside the X-ray tube may function improperly, degrade quickly, and/or destroy the pressure inside the X-ray tube. For similar reasons, o-rings, grease, or other conventional means for aiding in rotational lubrication between two components may be undesirable because of the vacuum in the xX-ray tube. Greases and other lubricating fluids with lower vapor pressure than liquid metals may vaporize and destroy the vacuum. In some examples, physical walls of different shapes and sizes may be placed at different angles to capture the lubricating fluid to reduce leakage through the bearing.

The second general method includes utilizing the capillary forces of the lubricating fluid, wherein the small gap between two opposing bearing surfaces wets the fluid to retain the fluid within the gap. In other cases, the anti-wetting properties of the surface (via texturing, coating, or both) aids in preventing the lubricating fluid from flowing in between the small gaps. In some examples, the surfaces are coated and/or textured to be more wetted such that the lubricating fluid clings in the small gap to reduce lubricating fluid moving through the gap. In other examples, the surfaces are coated and/or textured to be more anti-wetting such that the lubricating fluid is pushed away from the small gaps near the ends of the bearing assembly. In this context, the small gap may be in the range of 15-150 microns.

Operation of a liquid bearing assembly in X-ray tube systems, such as bearing assembly 50 of FIGS. 2 and 3, may be at least partially dependent on a tradeoff between load carrying capacity and fluid pumping force. In some examples, the load carrying capacity and fluid pumping force are inversely proportional and directly related to geometry of the bearing grooves 200. For example, given a substantially constant rotational speed of the liquid bearing assembly, deeper grooves 200 may provide a higher pumping force, while the increased clearance between the shaft 76 and sleeve portion 108 can reduce the load carrying ability of the bearing assembly 50. Pumping force may be utilized to contain the lubrication fluid and anti-wetting coatings may be applied to sealing surfaces to further assist in containing the lubrication fluid.

The lubricating fluid moves in between bearing surfaces as the shaft 76 and sleeve grooves 200 on the respective surfaces that are rotating relative to each other. The grooves 200 are separated by ridges 202 to direct the movement of the lubricating fluid along the grooves 200 and consequently provide rotordynamic stability by supplying pressure around the circumference of the bearing assembly 50. As such, the lubricating fluid is moved in a number of ways, including but not limited to, shearing, wedging, and squeezing, thereby creating pressures to lift and separate the shaft 76 and sleeve portion 108 from each other. This effect enables the liquid bearing to function and provide low-friction movement between the shaft 76 and sleeve portion 108. In other words, shearing of the lubricating fluid imparts energy into the fluid which cases the fluid to pump, wherein the pumping action into the gap between the shaft 76 and sleeve portion 108 is how the liquid bearing functions. Energy transfer from the surfaces to the fluid enables bearing functionality. In application, in the context of the X-ray tube, wetting between some bearing surfaces and the lubricating fluid allows shearing to impact energy to the fluid. However, anti-wetting between some bearing surfaces and the lubricating fluid allows friction between the bearing surfaces to be reduced, thereby reducing operating temperatures of the bearing assembly 50.

Figure 4:
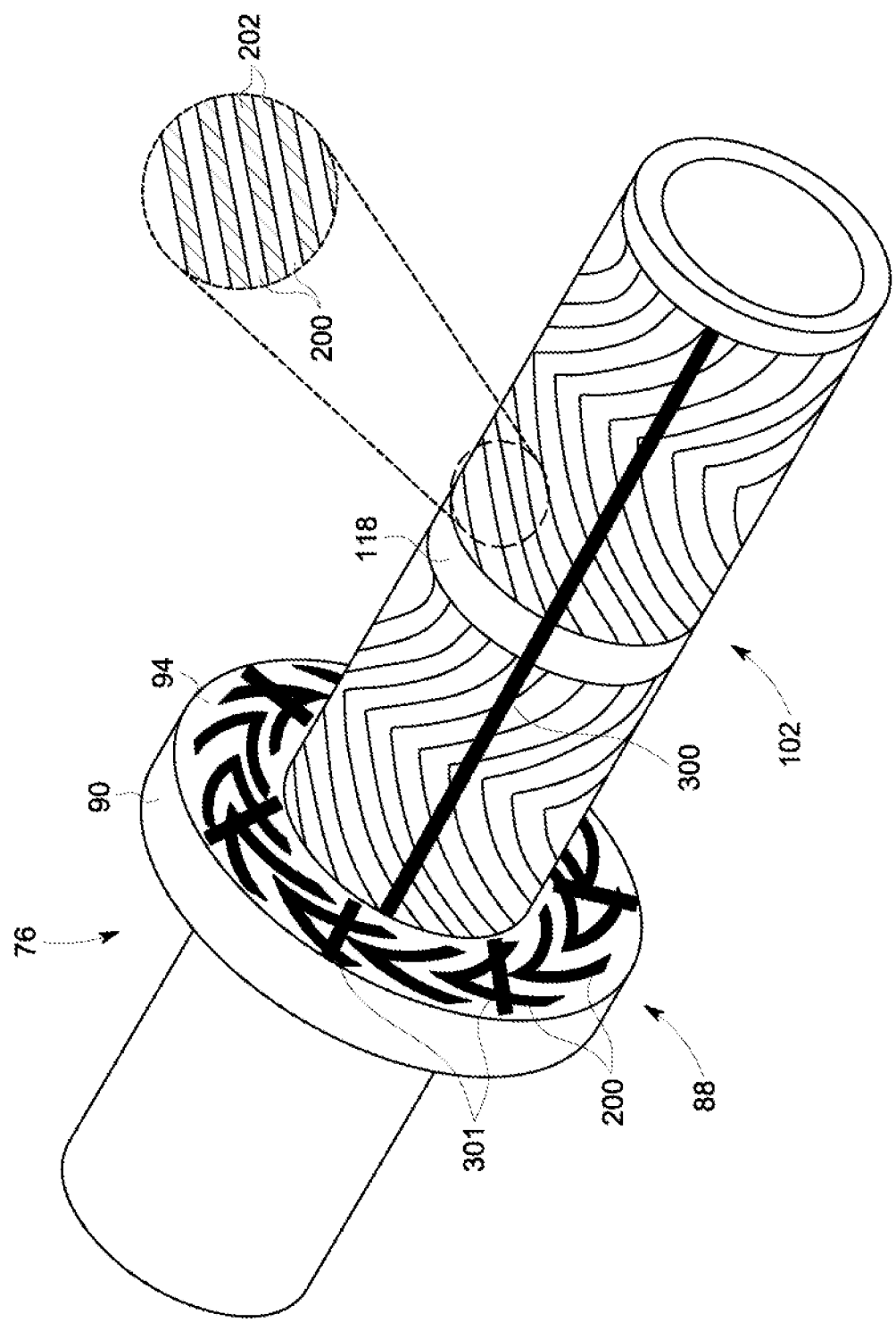
FIG. 4 is an isometric view the bearing structure of FIG. 3 including a vent groove therein formed in accordance with an exemplary embodiment of the disclosure.

Referring now to FIG. 4, in order to enable gas, gas bubbles, etc., trapped in the lubricating fluid 84 to escape the bearing assembly 50, the bearing assembly 50 includes one or more vent grooves 300 formed therein. In the illustrated exemplary embodiment of FIG. 4, the vent groove 300 can be disposed on the journal bearing 102 on the shaft 76 or on the thrust bearing 88. The vent groove 300 is formed with a size, i.e., a depth and width, to enable the groove 300 to create a pressure seal with the lubricating fluid 84 that readily allows the trapped gas to pass through the vent groove 300 and be vented to the exterior of the bearing assembly 50. In one exemplary embodiment, the vent groove 300 is formed to create a pressure seal with the lubricating fluid 84 that can resist a pressure less than atmospheric pressure, or less than approximately 14.1 psi. In other exemplary, embodiments, the vent groove 300 is formed to create a pressure seal with the lubricating fluid 84 that resists pressures of between 0 psi to about 1 psi. In another exemplary embodiment, the vent groove 300 can be formed with a width of at least 10 μm and a depth of at least 10 μm. In other exemplary embodiments, the vent groove 300 is formed with a width of at least 20 μm and a depth of at least 20 μm.

Figure 6:
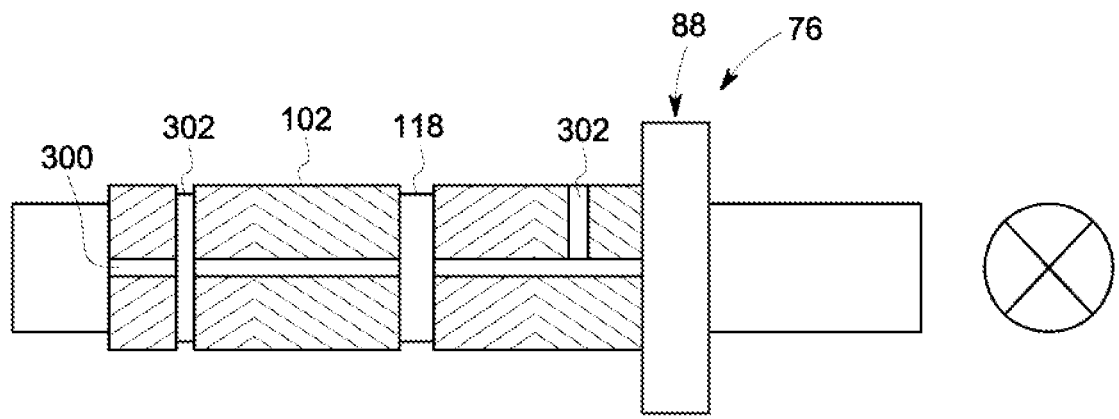
FIG. 6 is a front elevation view of the journal bearing of the bearing structure of FIG. 3 including vent grooves in accordance with another exemplary embodiment of the disclosure.

As illustrated in the exemplary embodiment of FIG. 4, the vent groove 300 on the journal bearing 102 can extend axially along the journal bearing 102 across the grooves 200 formed on the journal bearing 102 or can be a radial vent groove 301 disposed on one of the thrust bearing surfaces 94,96. In alternative exemplary embodiments, as shown in FIG. 6, the journal bearing 102 can include one or more circumferential vent grooves 302 disposed on the journal bearing 102, where the one or more circumferential vent grooves 302 intersect the axial vent groove 300. Alternatively, the axial vent groove 300 can be replaced by the one or more circumferential vent grooves 302.

Figure 7A:
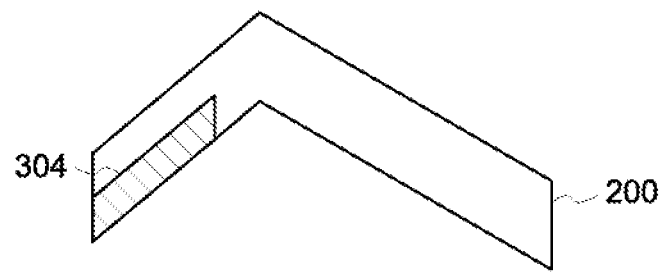
FIGS. 7A-7C are top plan and cross-sectional schematic views of vent grooves for the bearing structure of FIG. 3 formed in accordance with further exemplary embodiments of the disclosure.
Figure 7B:
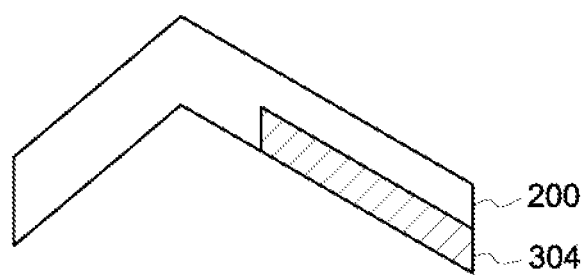
Figure 7C:
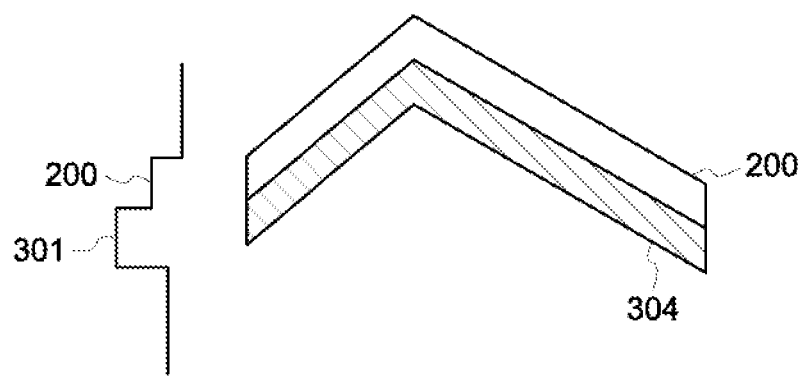

In still other alternative embodiments, as shown in FIGS. 7A-7C, the vent grooves 300 can be formed as deeper sections 304 of one or more of the grooves 200 formed in the journal bearing 102. The deeper sections 304 can extend along the entire length of the groove 200 (FIG. 7A) or can extend over only a portion of the groove 200 (FIG. 7B), with the deeper section 304 being formed as a part of the existing groove 200 (FIG. 7C) on either the inner half bearing or on the outer half bearing. In these embodiments for the vent groove 304, gas bubbles are vented into the center reservoir 118 with vent grooves 304 in the inner halt and to the outside of the bearing assembly 50.

Figure 5:
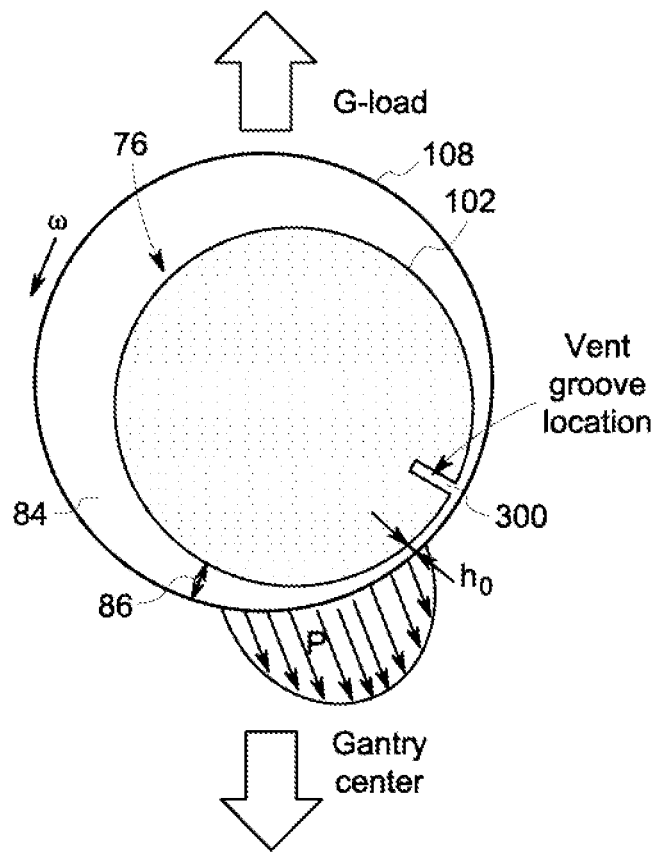
FIG. 5 is a schematic, cross-sectional view of the bearing structure of FIG. 4 formed in accordance with another exemplary embodiment of the disclosure illustrating the location of the vent groove relative to a high pressure region formed between the journal bearing and the sleeve forming the bearing structure.

Looking now at FIG. 5, with regard to any of the prior embodiments, in other exemplary embodiments it is desirable to position the one or more vent grooves 300 at a location on the journal bearing 102 where the vent groove 300 has the least detrimental effect with regard to the load bearing capacity of the bearing assembly 50, e.g., the ability of the lubricating fluid 84 to support the sleeve portion 108 on the shaft 76, at a location where the pressure of the fluid 84 within the gap 86 is lowest in all loaded conditions. To achieve this, the vent groove 300 is disposed on the journal bearing 102 outside of a region of high pressure P in the lubricating fluid 84 at the narrowest point/point of minimum approach $h_0$ between the sleeve portion 108 and the journal bearing 102 on the shaft 76. This point $h_0$ is defined as being disposed on the gantry side of the bearing assembly 50 but offset from the center of the alignment of the bearing assembly 50 with the gantry center due to the angular momentum ω of the sleeve portion 108 caused by the rotation of the sleeve portion 108 relative to the journal bearing 102. It is desirable to have the vent groove 300 positioned on the low pressure side of the region of high pressure to minimize the detrimental effects of the vent groove 300 on the load carrying capacity of the lubricating fluid 84. As such, in an exemplary embodiment the vent groove 300 on the journal bearing 102 is disposed at a position adjacent the point of minimum approach $h_0$ but spaced from the point of minimum approach $h_0$ in the direction of the rotation of moving component of the bearing assembly 50, or on the low pressure side of the point of minimum approach, or a cavitation region, if cavitation occurs. Further, as the location of the point of minimum approach $h_0$ varies based on the operating condition of the bearing assembly 50, in certain embodiments the vent groove 300 should be located where most effective for all desired operating conditions, such as in the low pressure side/region for all desired operating conditions, rather than in an optimal position for any particular operating condition of the bearing assembly 50, but without reducing performance of the bearing assembly 50 at any critical condition.

Figure 8:
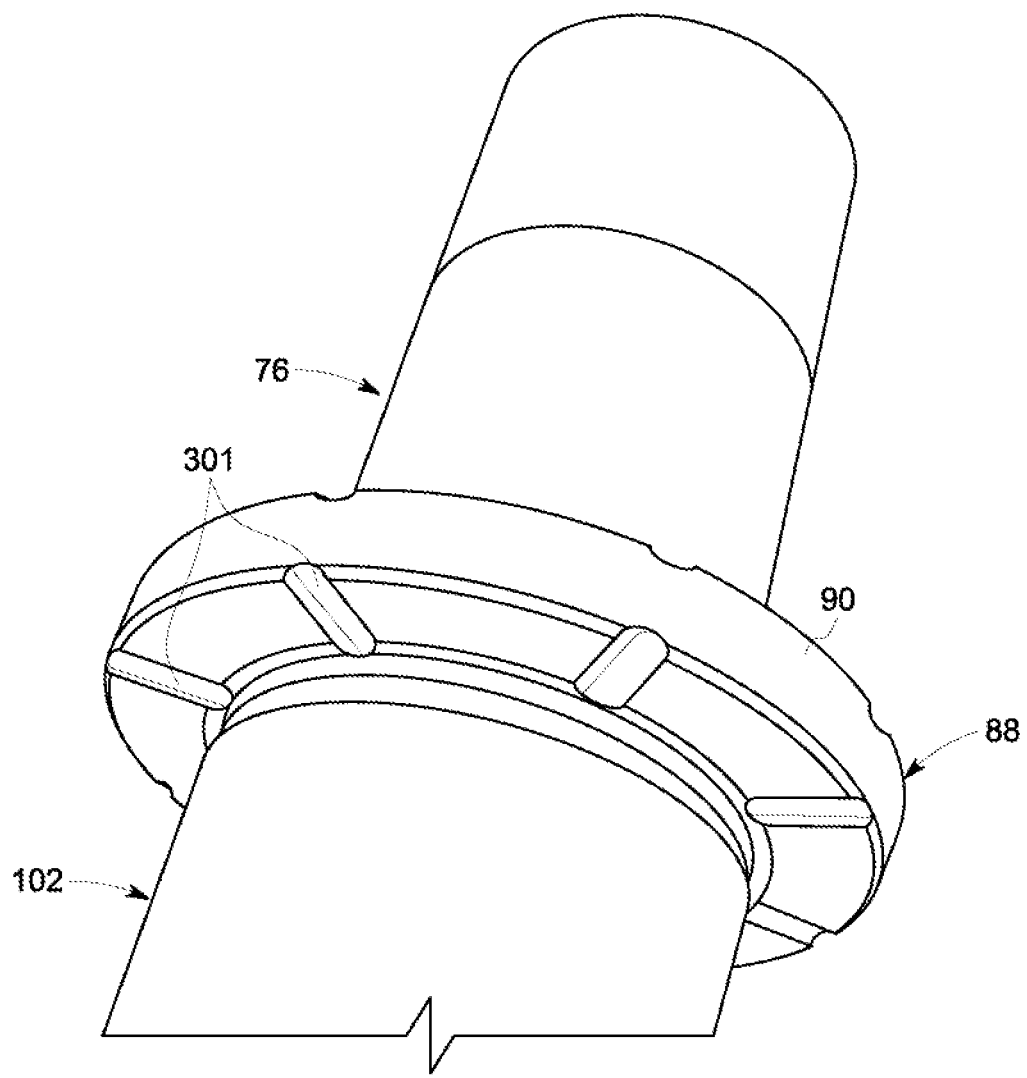
FIG. 8 is a perspective view of a thrust bearing including vent grooves for the bearing structure of FIG. 3 formed in accordance with further exemplary embodiments of the disclosure.

Referring now to FIGS. 4 and 8, in an exemplary embodiment the vent grooves 300 are disposed on the thrust bearing 88, either exclusively or in conjunction with vent grooves 300 located on the journal bearing 102. The vent grooves 300 in the thrust bearing 88 are located on one or both surfaces 94,96 of the thrust bearing 88 and can be formed in similar manners and with similar dimensions to the vent grooves 300 formed on the journal bearing 102. The vent grooves 300 on the thrust bearing 88 are disposed in pairs on opposite sides of the surfaces 94,96 in order to maintain the balance and/or alignment of the thrust bearing 88 relative to the sleeve portion 108 and thrust seal 110. Any number of pairs of the vent grooves 300 can be formed on the thrust bearing 88 on one or both surfaces 94,96 of the thrust bearing 88.

In other exemplary embodiments, the vent grooves 300 can include suitable wetting and/or anti-wetting coatings (not shown) in order to facilitate the operation of the vent grooves 300 in enabling gases to escape out of the bearing assembly 50. Further, the coatings and optionally surface texturing (not shown) can be utilized on the surfaces of the thrust bearing 88 and the journal bearing 102 disposed immediately adjacent the vent grooves 300 disposed therein in order to maintain the lubricating fluid 84 within the vent grooves 300 to provide the gas evacuation functionality while maintaining the load carrying pressure required for proper operation of the bearing assembly 50. In addition, as some constructions for the bearing assembly 50 employ a stationary sleeve 108 and a rotating shaft 76 disposed within the sleeve 108, in alternative embodiments the vent grooves 300,304 can be disposed on the various surfaces of the sleeve 108 facing the surfaces of the shaft 76.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bearing assembly for an X-ray tube, the bearing assembly comprising:
    a shaft;
    a sleeve disposed around the shaft, wherein one of the shaft and the sleeve is rotatable with regard to the other to form a rotating component and a stationary component;
    a lubricating fluid disposed between the shaft and the sleeve within a gap between the sleeve and the shaft; and
    at least one vent groove disposed on the stationary component.

2. The bearing assembly of claim 1, wherein the shaft is the stationary component and comprises:
    a journal bearing; and
    a thrust bearing extending radially outwardly from the journal bearing,
    wherein the at least one vent groove is disposed on at least one of the journal bearing and the thrust bearing.

3. The bearing assembly of claim 2, further comprising a number of bearing grooves disposed on the shaft.

4. The bearing assembly of claim 3, wherein the at least one vent groove is formed as at least one deeper section of at least one bearing groove.

5. The bearing assembly of claim 4, wherein the at least one vent groove is formed as a deeper bearing groove.

6. The bearing assembly of claim 2, wherein the at least one vent groove is formed on the journal bearing as an axial vent groove.

7. The bearing assembly of claim 6, further comprising at least one circumferential vent groove disposed of the journal bearing and intersecting the axial vent groove.

8. The bearing assembly of claim 2, wherein the at least one vent groove is disposed on the thrust bearing.

9. The bearing assembly of claim 8, wherein the at least one vent groove comprises at least one pair of opposed vent grooves.

10. The bearing assembly of claim 1, wherein the at least one vent groove is disposed on the stationary component at a location on a low pressure side of a point of minimum approach between the shaft and the sleeve.

11. The bearing assembly of claim 1, wherein the at least one vent groove forms a pressure seal with the lubricating fluid that resists pressures of less than 14.1 psi.

12. The bearing assembly of claim 1, wherein the at least one vent groove has a width of at least 10 μm.

13. The bearing assembly of claim 1, wherein the at least one vent groove has a depth of at least 10 μm.

14. A method for enabling gases trapped in a bearing assembly to be vented from bearing assembly during use in an operating X-ray tube, the method comprising the steps of:
    providing a bearing assembly comprising:
        a shaft;
        a sleeve disposed on the shaft, wherein one of the shaft and the sleeve is rotatable with regard to the other to form a rotating component and a stationary component;
        a lubricating fluid disposed between the shaft and the sleeve within a gap between the sleeve and the shaft; and
        at least one vent groove disposed on the stationary component; and
    operating the X-ray tube to rotate the rotating component relative to the stationary component.

15. An X-ray tube comprising:
    a cathode assembly; and
    an anode assembly spaced from the cathode assembly, wherein the anode assembly comprises:
        a shaft;
        a sleeve disposed on the shaft, wherein one of the shaft and the sleeve is rotatable with regard to the other to form a rotating component and a stationary component;
        a lubricating fluid disposed between the shaft and the sleeve within a gap between the sleeve and the shaft; and
        at least one vent groove disposed on the stationary component; and
    an anode target operably connected to the sleeve.

16. The X-ray tube of claim 15, wherein the shaft is the stationary component and comprises:
    a journal bearing; and
    a thrust bearing extending radially outwardly from the journal bearing,
    wherein the at least one vent groove is disposed on at least one of the journal bearing and the thrust bearing.

17. The X-ray tube of claim 16, wherein the at least one vent groove is formed on the journal bearing as an axial vent groove.

18. The X-ray tube of claim 17, wherein the axial vent groove is disposed on the journal bearing at a location on a low pressure side of a point of minimum approach between the shaft and the sleeve.

19. The X-ray tube of claim 16, wherein the at least one vent groove is disposed on the thrust bearing.

20. The X-ray tube of claim 15, wherein the at least one vent groove forms a pressure seal with the lubricating fluid that resists pressures of between 0 psi and about 1 psi.

* * * * *